Patented Feb. 3, 1948

2,435,554

UNITED STATES PATENT OFFICE 2,435,554

PHENOLIC-ALKYD RESINS

Loring Coes, Jr., Brookfield, Mass., assignor to Norton Company, Worcester, Mass., a corporation of Massachusetts No Drawing. Application August 31, 1945, Serial No. 613,967

18 Claims. (Cl. 260—44)

This invention relates to resins, and more particularly to phenolic-alkyd resins and methods of making them.

This application is a continuation in part of my application Serial No. 590,515 filed April 26, 1945.

One object of the invention is to provide a practical, inexpensive and strong thermosetting or thermoplastic resin that can be compounded in a simple and inexpensive manner to form a potentially reactive composition having a fluidity that will adapt it for so-called casting, as by pouring, into molds or the like to shape it, or for facilitating impregnation of various products, such as textiles, fabrics, porous materials, and the like.

Another object is to provide a resin of the above-mentioned character that will dependably overcome certain shortcomings or deficiencies in known so-called casting resins, particularly such known resins as certain phenolic formaldehyde resins which, in cast and cured form, are inherently much weaker than when cured in molds under heat and pressure. In such prior known resins, there is a substantial or high magnitude of production of water during cure, being on the order of 15% of $H_2O$, by weight, and hence they have an inherent weakness both in cast and molded form when cured, the production of substantial quantities of water being a factor in precluding the achievement of substantial strength. Expedients such as curing at very low temperatures have been resorted to in the effort to improve such known resins but such expedients are offset by accompanying disadvantages such as the need for increased time periods to effect cure and the need for higher catalyst concentrations in the endeavor to effect cure at such low temperatures. Furthermore, curing at low temperatures means in effect that reaction or polymerization are incomplete, resulting in inherent weaknesses in the resin, in shrinkage with aging, and in a tendency to craze on the surface, etc., etc.

Furthermore, in such known resins, clear or transparent or highly translucent cured pieces or parts cannot be achieved and the resins turn out to be "milky," due to the distribution throughout of small particles of water; in the attempt to overcome this disadvantage, ingredients are sometimes added intended to absorb and thus retain water that is formed during cure but the strength of the ultimate resin remains impaired. Also, such known resins have high viscosity, making their use for casting or impregnating difficult or disadvantageous.

One of the dominant aims of this invention is to provide a resinous compound, in both potentially reactive and cured forms, in which such disadvantages as those above noted are avoided or overcome. Another object of the invention is to provide resins of the just mentioned character which are thermosetting. Another object is to provide a resin of low viscosity well suited for casting and thus making for good precision in the shaping of articles by the casting process, and giving when cured superior strength and when desired good transparency or high translucency. Another object is to provide a resin of the described character that will have superior strength. Another object of the invention is to provide resins of the described character in which, upon cure, the above described detrimental effects of water of formation are materially reduced or are eliminated. Another object is to provide potentially reactive resinous compositions in which upon reaction water is formed in immaterial amount or in which its effects are substantially inconsequential, whereby also superior mechanical characteristics, such as tensile and compressive strength, may be dependably achieved. Another object is to provide a potentially reactive resinous composition of the just mentioned character that will be well adapted for molding as distinguished from casting.

Another object is to provide resins of the above mentioned nature in which, according to such factors as the use to which the cured resin is to be put, such factors as the strength of the resinous end product may be controlled or varied, thus to provide a range of potentially reactive resins curable to a wide range of desired physical characteristics. Another object is in general to provide improved resins, more particularly for casting, impregnating or like handling when in potentially reactive form. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

According to my invention as described in my above mentioned application, I react penta erythritol diformal with a mixture of a phenol and a polybasic polycarboxylic acid anhydride, under conditions or controls which are later described and which are selectable or variable at will according to the desired results, to produce resins of varying useful or valuable characteristics, the resins thus produced comprising a mixture of a phenolic resin and an alkyd resin e. g., penta erythritol maleate. In principle, the acetal, i. e., penta erythritol diformal in the reaction accompanying curing, breaks up and forms a polyhydric alcohol and an aldehyde of which the former reacts with the anhydride to form an alkyd resin and the aldehyde reacts with the phenol to produce a phenolic resin, a feature of the reaction residing in the fact that water is formed in immaterial quantity whereby I am enabled to overcome or avoid many defects in certain known resins, particularly casting resins, some of which have been noted above. The resultant resins have characteristics such as fluidity or low viscosity in the potentially reactive form or tensile strength in the cured or reacted form that far surpass those of known resins usable for analogous purposes, such as casting, impregnating and the like. In all cases the very material advantage of immaterial water formation is present.

These and other advantages I can also achieve according to my present invention, all as is later set forth herein, and as conducive to a readier understanding of my present invention, the invention as described in my above-mentioned copending application will be first set forth.

Some of the phenols are less reactive than others. But in such cases I employ a suitable catalyst of which, also, a broad class of substances is usable, as is later explained. Even with the more reactive substances I may, however, and preferably do use a catalyst and thus I am enabled, as by choice of ingredients based upon reactivity with others, or by choice of character, strength or amount of catalyst, to provide a wide range of controls or predetermination of the time element to be involved in the curing, appropriately related to temperature or temperatures of cure. Moreover, particularly in the case of casting or like resins, I am enabled also, by appropriate correlation of such factors as those just mentioned, to produce potentially reactive forms by my process that can be cured at relatively high temperatures in relatively short periods of time, in contrast to the imposed handicap, in certain known types of casting resins, of imposed low-temperature cure throughout long curing periods. Other features and distinguishing coactions and characteristics are later pointed out herein.

The acetal which I use, namely, penta erythritol diformal, is represented by the following formula:

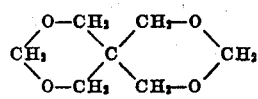

Any mono-hydroxy phenol having at least two unsubstituted positions in the benzene ring that are ortho or para to an hydroxyl group is usable according to the disclosure of my aforesaid application, while according to my present improvement, as later described, I am enabled to use any of the class of phenol aldehyde resins made from such phenols provided they are, as later described, deficient in aldehyde; the class of phenols include phenol, the cresols, and the xylenols. Reactivities of these various phenols vary, as will be understood; they are all productive of resins according to my invention.

This class of phenols may be represented by a basic formula as follows:

The polybasic polycarboxylic acid anhydrides also include many members of which some are preferred to others according to the desired characteristics of the ultimate resin or according to the purpose or use to which the resin is to be put. Illustrative members of this class include maleic anhydride, succinic anhydride, glutaric anhydride, methyl maleic anhydride, chloromaleic anhydride, endomethylene-tetrahydrophthalic anhydride, phthalic anhydride, citric anhydride, and aconitic anhydride. I prefer maleic anhydride.

These polybasic polycarboxylic acid anhydrides may be represented essentially by the following formula:

in which R″ is any divalent aliphatic or aryl radical.

The acetal, the phenol and the anhydride react, in general, in the manner earlier above described, and the fundamental reaction is represented by the following:

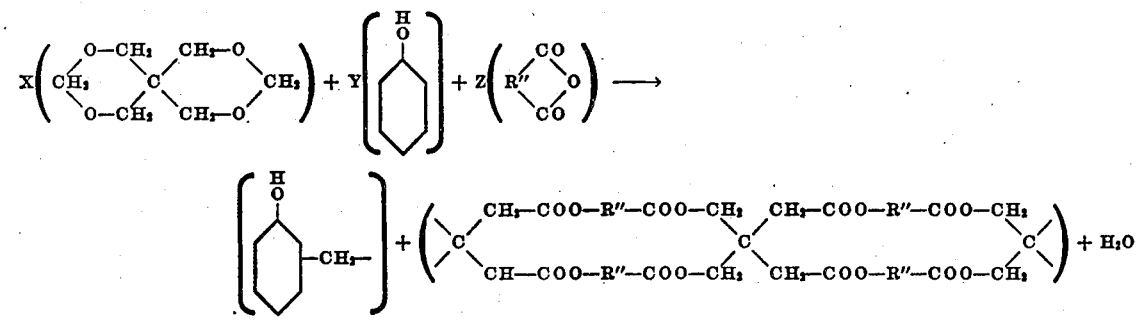

in which the first, second and third groups or formulae represent respectively the penta erythritol diformal, the phenols, and the polybasic polycarboxylic acid anhydrides; the fourth group represents the phenol resin, the fifth group represents the alkyd resin, and the sixth group of course represents water. The cured alkyd resin is thermosetting. The tetrafunctional characteristic of the central carbon atom of the acetal brings about cross-linking. The ratio of phenol to acetal can be varied to produce any desired amount of cross-linking of the phenolic component. The acetal supplies for each mol thereof on the phenol, two aldehyde groups to do the cross-linking to form the phenol aldehyde resin component of the cured or end product.

As earlier above noted, a catalyst is employed according to my copending application, particularly with the less reactive phenols, and is preferably employed in any case, thus to speed up the reaction during cure and lessen the time period of heat treatment. The catalyst can be any strong acid or hydrolyzable salt of a weak base and a strong acid; strong acids such as hydrochloric, sulphuric and nitric acids are illustrative but their action is usually to speed up the reaction too much and hence it is preferred to bring them into the potentially reactive mix by way of a salt of the above mentioned character such as, for example, aniline hydrochloride, stannic chloride, ferric chloride, aluminum chloride, zinc chloride, etc. Phosphoric acid as such is usable and is an illustration of an acid that is directly employed; other illustrations of the latter type are sulphamic acid and paratoluene sulphonic acid.

Also I am not limited to the use of only one of each of the ingredients in that one or more of each in admixture may be employed; thus, for example, instead of using only a single phenol, mixtures of two or more phenols may be employed, such as a mixture of phenol and resorcinol. Thus a wide variety of characteristics in the end product or cured resin may be achieved and also a wide variety of curing temperatures and time periods of cure, selectable according to best suitability for various purposes, are possible according to my invention.

Illustrative compoundings of the potentially reactive resin mix are set forth in the following table taken from my aforesaid application which is not intended to be all-inclusive or by way of limitation but is set forth solely as illustrative, the table giving in numbers the mols of each ingredient, thus also to set forth illustrative but not limiting molecular proportions employable. The column headed "Catalyst" is likewise not all-inclusive and is not to be interpreted in a limiting sense, the abbreviation "p. T. S. A." meaning para toluene sulphonic acid, it being noted that the catalyst in each case is included in an amount that is substantially 0.2% by weight.

heating cycle can be widely varied both as to temperature and time in view of selectable factors, such as those above described.

The potentially reactive mixes are in liquid form and in general are of low viscosity and hence have great ease of flow or pour, making them superior for casting into molds or forms or the like, for impregnating fibrous, porous or cellular products and also for bases for coatings. The three principal starting ingredients are at ordinary room temperatures, usually solids, but have relatively low melting points, become liquid simply upon mixing them together in solid form, the resultant liquid or mix having good fluidity as above stated, while other mixes of the starting ingredients that do not thus of themselves coalesce or melt into a single liquid mass need only to be heated to bring about their melt, their low melting points not requiring heating to substantial degrees. Water production during cure is found to be not detrimental to the desired characteristics of the cured resin itself; this may be accountable for by reason of the fact that, according to the typical reaction above set forth, the proportion of water formed is so low as to be of inconsequential or immaterial effect. In contrast to water production on the order of 15% by weight in known casting resins, the cause of many deficiencies therein, as above noted, water production according to my invention is on the order of about 4–7%. Transparency or a high degree of translucency, as distinguished from the "milky" condition caused by water of formation in prior resins, is thus according to my invention substantially unimpaired, and thus clear cured resins may be readily achieved. Moreover, expedients such as additives to dissolve or absorb water of formation, such additives usually having detrimental effects upon the end product, need not be resorted to.

The resins in the cured state are easily workable by machine tools, such as turning, drilling, sawing and the like, are also easily worked by abrasives, and their surfaces can take or can be given a high degree of polish such as may be desirable or needed where transparency or high translucency of a machined resin article is de-

| | Phenol | Acetal | Anhydride | Catalyst |
|---|---|---|---|---|
| 1 | Cresol 1.0 | Penta Erythritol diformal 0.75 | Maleic 1.5 | p. T. S. A. |
| 2 | Phenol 1.1 | do 0.75 | do 1.5 | p. T. S. A. |
| 3 | do 1.0 | do 0.75 | Phthalic 1.5 | p. T. S. A. |
| 4 | do 1.0 | do 0.75 | Succinic 1.5 | p. T. S. A. |
| 5 | do 1.0 | do 0.75 | Maleic 1.5 | p. T. S. A. |
| 6 | do 1.0 | do 0.75 | do 1.5 | $ZnCl_2$ |
| 7 | do 1.0 | do 0.75 | do 1.5 | Sulphamic acid. |
| 8 | do 1.0 | do 0.75 | Endomethylene-tetrahydro-phthalic 1.5 | $ZnCl_2$ |
| 9 | do 1.0 | do 0.75 | Succinic Anhydride 0.75 / Maleic Anhydride 0.75 | Do. |
| 10 | do 1.0 | do 0.75 | Phthalic Anhydride 0.75 / Maleic Anhydride 0.75 | Do. |
| 11 | Phenol 0.5 / Xylenol 0.5 | do 0.75 | Maleic Anhydride 0.75 | Do. |
| 12 | Phenol 0.5 / Resorcinol 0.5 | do 0.75 | do 1.5 | Do. |
| 13 | Phenol 0.5 / M. Cresol 0.5 | do 0.75 | do 1.5 | Do. |
| 14 | Phenol 0.5 / P. Phenol Phenol 0.5 | do 0.75 | do 1.5 | Do. |

Polymerization of the above illustrative potentially reactive mixes was effected under heat treatment at 70° C. for 18 hours followed by heating at 130° C. for ten hours, and this cycle of heat treatment is also illustrative, being suitable in relation to the character and amount of catalyst employed, it being noted that it was selected as a matter of convenience in testing out a large number of potentially reactive mixes and that the sirable. Not all of them are transparent or translucent; some of them are opaque, such as Example No. 1 of the above table, due to the selection of ingredients (cresol as the phenol), others are clear, such as Examples 5, 6, 7 and 8, and others are of various intermediate characteristics as far as light transmission is concerned. Thus my invention makes for facility of selection according to whatever light characteristics are desired or suitable for the purpose to which the end product is to be put.

A wide and superior range of tensile strengths is also achievable, thus also providing for a range of selection according to the intended uses or application of the resins. This range, in an upward direction, far exceeds tensile strengths achievable in heretofore known casting resins which, as earlier above noted, at least for the phenolic formaldehyde type, range about from 8,000 to 10,000 as a modulus of rupture; for example, the modulus of rupture of Example 5 is 26,000; of Example 6, 18,000; of Example 7, 15,500; of Example 8, 20,000; of Example 1 12,400. By appropriate selection, therefore, I am enabled to produce cast resinous products having mechanical strength surpassing known types of casting resins, being on the order of two or three times as strong.

As earlier above noted, any of the principal ingredients disclosed may, in compounding the resin, be employed in admixture of two or more forms of that ingredient. Examples 11, 12, 13 and 14 illustrate how two different phenols may be employed in admixture in making up one of the principal ingredients and since, as will now be apparent, many combinations of phenols may thus be made and employed, the just mentioned examples are set out as illustrative and not in a limiting sense.

In a similar way, Examples 9 and 10 illustrate, again not by way of limitation, and for the same reasons above mentioned, how two different anhydrides may be employed instead of only one, in making up the anhydride ingredient. Two or more catalysts may be employed in admixture where they are not reactable with each other.

The modulus of rupture of Example 11 is 18,300; of Example 12 is 15,200; of Example 13 is 12,700; and of Example 14 is 10,800; these figures illustrate ranges available where mixtures of phenols are employed. The modulus of rupture of Example 9 is 14,000 and of Example 10 is 12,500, thus illustrating selectable characteristics available through use of mixtures of anhydrides.

Similar advantages such as those outlined herein are obtainable according to my above mentioned application when the resinous compositions are made up in a form such as powdered form for molding as distinguished from casting. To make them up in such form, the procedures above described are followed excepting that the heat treatment is carried on under conditions such that the reaction is only partially carried to completion, being carried on under conditions to effect sufficient hardening, whereupon the incompletely cured and hardened mass is cooled and may then be broken up or ground up to the desired condition, such as powdered form. Inasmuch as it has been only partially cured, the product remains potentially reactive and in solid or hardened or powdered form may then be used as may be dictated by circumstances and again subjected to heat treatment, this time to carry the reaction to completion. In powdered form other ingredients may be mixed therewith, such as fillers, pigments, dyes or the like, just as other ingredients such as those just named may be mixed into the potentially reactive resin when it is in liquid form for casting purposes. In potentially reactive powdered form, it may be employed for molding, using any techniques or procedures usually employed in using molding resins, and the cure completed under suitable conditions of heat and where desired also under suitable conditions of pressure.

Conversion of the potentially reactive liquid form of the resin to the potentially reactive solid form will vary as to temperature and time, depending upon such factors as the reactivity of the starting ingredients, the character and amount of catalyst employed, etc., etc., as will now be clear in view of all of the foregoing, the heating cycle being in each case appropriately suited to avoid carrying the reaction to completion and simply to carry the reaction only far enough to effect appropriate solidification or hardening of the potentially reactive mix. The heating cycle is thus to be understood to be widely variable in view of selectable factors such as those just mentioned. Illustratively, a cycle of heat treatment may be at 70° C. for 48 hours.

The subsequent heat cycle to effect completion of the reaction of the molded resin, whether compounded for thermosetting or thermoplasticity, will likewise vary widely with such selectable or controllable factors as those above mentioned and, of course, can further vary with the shape or mass of the molded potentially reactive resin. For example, and as is well known, a relatively thin molded piece cures faster than a thick or massive molded part. An illustrative heat cycle to effect final conversion or to effect completion of the reaction can be heat treatment at 175° C. for 24 hours.

An illustrative procedure or example is set forth as follows: 1.2 mols of phenol, 0.75 mol of penta erythritol formal, and 1.5 mols of maleic anhydride, with 0.5% by weight of zinc chloride as the catalyst is made up into a liquid mix which, as in the illustrative examples above given, is of course potentially reactive. That liquid mix was heated for 48 hours at 70° C. to carry the reaction far enough to effect hardening, whence the mass was cooled to room temperature and ground up into powdered form, giving a potentially reactive resin in solid form as distinguished from liquid form. The proportions used in this illustration are such as to give a thermosetting resin upon final conversion or cure. In powdered form it was used for molding under pressure and then subjected to a heat cycle of 175° C. for 24 hours. The catalyst, it will be understood, does not react or take part in the reaction and hence is present in the solid or powdered form of potentially reactive resin which when subjected to the final heat cure carries the polymerization or reaction to completion under the effect of the catalyst.

As noted in my said application, the advantages earlier above described, particularly with respect to the water or $H_2O$ factor, are fully realizable whether the resins are used as casting resins or as molding resins. In either case, a feature of the reaction resides in the fact that water is formed in immaterial quantity due to the fact that the specific nature of the reaction, typified in the generic or fundamental equation of reaction earlier above set forth, does not permit or so controls water formation that its effect on or in the end product is not detrimental or its formation is in amount insufficient to produce any detrimental effects. Furthermore, I achieve also definite or positive control of the respective rates at which the phenol aldehyde resin component and the alkyd resin component, in the end product, are formed, and thus, in the end or reaction product, there is the same degree or extent of cure as to both types of resins, that is, if the reaction is carried to completion as is of course desired in the final product, all of the components that form the phenol aldehyde resin are reacted and all of the components that form the alkyd resin are reacted. As a result the reaction product also has great strength. In the end product there is thus no contamination or weakening of a resin that is completely reacted or cured by such components of the other resin as are not completely reacted, for incompleteness of reaction of such components can be and is prevented according to my invention. Moreover, throughout the reaction, the respective rates at which the components that form the two resins are controllable may be made to be the same so that as the reaction proceeds, the production and cure of each of the two resins proceeds in step or in synchronism. These factors favorably affect such advantages as strength of the end product and homogeneity of the two types of resins therein.

These controls arise out of the coactions of the ingredients initially employed, all as is indicated in the above equation of reaction; the acetal employed has, as earlier above pointed out, the characteristic of breaking up to supply two components, namely, an alcohol and an aldehyde with which the anhydride and the phenol are respectively reactive to form respectively an alkyd resin and a phenolic resin. The phenol cannot react with the aldehyde to form a phenolic resin at a rate different from the rate at which the alcohol reacts with the anhydride to form the alkyd resin, and vice versa, because these respective reactions in turn are dependent upon the rate at which the acetal breaks up to supply, at a corresponding rate, the respective components which the phenol and the alcohol respectively require for reaction. For example, even though a highly reactive phenol and a lesser reactive anhydride were to be employed, with such an acetal, the highly reactive phenol can react during cure only at the rate at which the acetal supplies to it the aldehyde and thus the formation of the phenolic resin is held down to the rate at which the lesser reactive anhydride reacts with the alcohol at the rate at which the latter in turn is provided to it for reaction. Neither resin is thus formed more rapidly than the other. The presence of the catalyst, acting to speed up where necessary the entire reaction, insures that a lesser reactive ingredient such as a lesser reactive phenol or a lesser reactive anhydride, reacts at least at the rate at which its companion component is supplied by the breaking up of the acetal and thus prevents a lesser reactive component or ingredient from falling behind, in its reaction, the rate at which the acetal makes the companion component available.

As above noted, the potentially reactive resin can be compounded to become thermosetting, by properly relating the respective quantities employed in making up the mix. The general rules or guides to follow are as follows:

Since the acetal is a di-acetal (penta erythritol diformal), the molecular proportions to employ are 1 mol of the diacetal, 1½ to 2 mols of phenol, and 1 to 2 mols of the acid anhydride.

The coefficients $x$, $y$ and $z$ of the above equation of reaction will now be seen to be the respective mols to employ in proportioning the starting ingredients and represent also the respective mols set forth in the various and numerous illustrative examples above set forth.

According to my present invention, I have discovered that in place of the broad class of phenols as one of the three classes of starting substances above set forth, I can employ any phenol aldehyde resin that is made with less than one mol of aldehyde per mol of the phenol constituent and that, therefore, is deficient in aldehyde, thereby achieving substantially all of the unique advantages above described where the broad class of phenols is employed, and moreover achieve a number of further advantages. The class of phenolic aldehyde resins is those derived from any monohydroxy phenol having at least two unsubstituted positions in the benzene ring that are ortho or para to an hydroxyl group and they are usable in a great variety of combinations with the penta erythritol diformal and with polybasic polycarboxylic acid anhydrides. In principle the acetal in the reaction accompanying curing breaks up and forms a polyhydric alcohol and an aldehyde of which the former reacts with the anhydride to form an alkyd resin and the aldehyde reacts with the aldehyde-deficient phenolic-aldehyde ingredient to produce a phenolic resin, the end products being of widely varying characteristics according to the selection of the three principal starting ingredients and other factors and having a wide variety of characteristics generally like those earlier above described, including the desirable feature of water formation taking place in immaterial quantity.

Any phenol aldehyde resin of the above mentioned class deficient in aldehyde may be used, and it is made up so that the aldehyde constituent is present in a molecular ratio to the phenolic constituent that is less than one to one, and in so making it up any of the phenols of the above mentioned class of phenols may be employed and any aldehyde such as formaldehyde, acetaldehyde, propionaldehyde, furfural aldehyde, etc., etc. Best results have been obtained by using phenol formaldehyde resin made from between 0.5 and 0.9 mol of formaldehyde per mol of phenol. For example, such an aldehyde-deficient resin may be made up as follows:

1070 grams of 88% phenol (liquefied with 12% of water) and 525 cc. of 40% formalin are heated under reflux with 15 cc. of 3% hydrochloric acid. When the vigorous exothermic reaction starts, the mixture is cooled until reaction has subsided. The mixture is then heated at 100° C. for six hours and then cooled. The water is separated and the viscous resin dehydrated under a vacuum of about 15 to 20 mm.

455 grams of the resin are dissolved in a liquid mixture of 240 grams of pentaerythritol diformal and 305 grams of maleic anhydride. 5 grams of powdered zinc chloride are added and the mixture filtered and cast into molds. The castings may be cured by heating initially at 70 to 90° C. for from 10 to 20 hours with a final cure at 120 to 175° C., depending upon the properties desired. The resin cured at 150° C. has a modulus of rupture of from 18,000 to 22,000 pounds per square inch, a tensile strength of 12,000 pounds per square inch, and a Rockwell hardness on the H scale of 120 to 125.

By way of further example, a fusible phenolic resin was made by heating 10.70 pounds of 88% phenol with 5.25 pounds of 40% formalin and 50 cc. of 5% hydrochloric acid under reflux for four hours. The water layer was drawn off and the resin dehydrated at 100° C. under 17 mm. pressure.

4.55 pounds of the resin was crushed and dissolved by heating in a mixture of 3.25 pounds of maleic anhydride and 2.60 pounds of pentaerythritol diformal. 10 cc. of 85% phosphoric acid was added to the mixture which was then cast in lead molds coated with lubricant.

The castings were cured by heating 16 hours at 95° C., 8 hours to 130° C. and 16 hours at 130° C. The resin was pale orange and free from cracks and bubbles, had a tensile strength of 12,000 pounds per square inch, a flexural strength of 20,500 pounds per square inch, and a Rockwell hardness of 125 on the H scale.

In generally similar manner, other phenols such as those earlier above mentioned may be employed in making up aldehyde-deficient phenolic resins and in such manner I have made up such resins by the use of p. cresol, resorcinol, m. cresol, t. butyl phenol, and p. phenyl phenol, using them individually or alone, also in admixture, particularly with phenol.

With them individually or in admixture, any of the anhydrides earlier above mentioned may be employed, in much the same way and according to much the same selectability and variability as earlier above explained. The use of catalysts is in a similar manner, as earlier above explained, followed. Likewise time and temperature of cure are selectable or variable as will now be understood.

In general, the advantages above explained with respect to the practicing of my invention where one of the three principal or starting substances is selected from the class of phenols, may be achieved in using aldehyde-deficient phenolic resin, but in addition other distinctive advantages ensue. For example, I am enabled not only to control the reaction with nicety but also I am enabled to control, for any combination of the three starting ingredients, the viscosity; for casting into a simple or large mold, high viscosity is suitable and frequently desired whereas for casting into intricately shaped molds low viscosity insures the making of accurate cast articles, and by using aldehyde-deficient resins as one of the starting substances, I gain the advantage of their relatively great solubility in the mix of acetal and anhydride, a solubility which however I can vary in accordance with a degree of deficiency of the resin in aldehyde. As that deficiency is lessened, the solution of the mix of the three starting ingredients becomes more and more viscous.

The facility of determining the viscosity is thus of considerable practical advantage. Where higher or high viscosity of the uncured mix is desired as for certain casting operations or molds as above noted, the resin of my invention achieves the added advantage of lessened over-all shrinkage during cure and also a somewhat shorter time of cure, for I have found that as viscosity is increased by lessening the aldehyde deficiency, over-all shrinkage during cure is diminished, and thus also I am enabled to determine in advance the extent of shrinkage, a factor highly desirable in some resin-casting operations. On the other hand, by increasing the aldehyde deficiency in the aldehyde-deficient phenolic resin constituent, lower and lower viscosity of casting resin is achieved and thus, aside from better adaptation for casting into intricate molds, the mix is usable for impregnation of impregnatable materials or substances such as fibrous strands and materials and is usable for numerous other purposes. When casting into molds, molds of aluminum, lead, lead alloys, and other metals may be used, also of glass, paper, plaster of Paris and the like.

During cure, even less water of formation occurs than when only phenols are used as one of the starting ingredients and thus the numerous advantages earlier above pointed out as following from substantial reduction (reduction to about 4% to 7%) of water of formation are materially enhanced; in other words, I am enabled to reduce water formation to less than the percentages just mentioned.

Physical properties of the cured resin are in general like those earlier above described although I am enabled, according to selection or variability of the various factors above outlined, and also certain other or additional variables made possible according to my present invention, to achieve additional controls and better physical properties in the end product. The nature of certain of these variables will be better understood after considering initially the fundamental reactions. Thus, the class of phenolic resins usable as a constituent of my invention may be written thus:

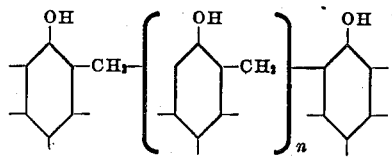

The reaction of the aldehyde-deficient phenolic resin with the acetal and the anhydride is represented by the following:

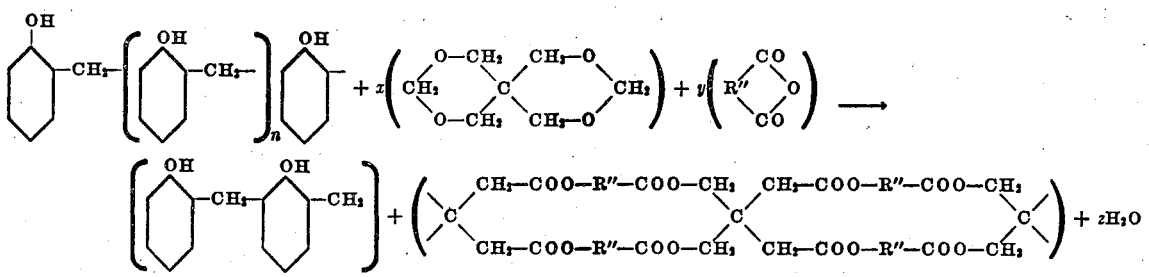

in which the first, second and third groups or formulae represent respectively the above described aldehyde-deficient phenolic aldehyde resins, the acetal and the polybasic polycarboxylic acid anhydrides; the fourth, fifth and sixth groups represent the end product and are respectively the phenolic resin, the alkyd resin, and water. For complete cross-linking saturation the exponents $x$ and $y$, are:

$$x=\frac{n+4}{4} \qquad y=\frac{n+4}{2}$$

The acetal, in the reaction accompanying curing, breaks up and forms a polyhydric alcohol and an aldehyde; the former reacts with the anhydride to form an alkyd resin and the aldehyde reacts with the aldehyde-deficient phenolic resin constituent to produce a phenolic aldehyde resin. Again, a feature of the reaction according to my invention is that definite or positive controls are possible during cure, for the decomposition of the acetal takes place at controllable rates, thus furnishing the polyhydric alcohol at a corresponding rate for reaction with the anhydride to form the cured alkyd resin while synchronously therewith the aldehyde is furnished at a commensurate rate to react the aldehyde-deficient phenolic resin to a cured phenolic aldehyde resin; these two reactions continue during cure synchronously, neither can precede the other, there is the same degree or extent of cure as to both types of resins, and both components of both types of resins reacted during cure. Again the reaction product has great strength, in fact, physical properties surpass those of the resins where phenol is one of the three starting ingredients. Also greater variability or selectability of physical properties of the end product is possible and this I am enabled to achieve by varying certain ratios or proportions as will be seen from the following tables of comparative specimens:

Table I
[All cured for 16 hours at 95° C. followed by 16 hours at 130° C.]

|   | A | B | C | Modulus of Rupture | Specific Gravity | Rockwell-M (Hardness) | Water Absorption |
|---|---|---|---|---|---|---|---|
|   |   |   |   |   |   |   | Per cent |
| 1 | 0.7 | 1.2 | 2 | 18,400 | 1.33 | 108 | 0.21 |
| 2 | 0.7 | 1.3 | 2 | 12,100 | 1.35 | 111 | 0.23 |
| 3 | 0.7 | 1.4 | 2 | 10,300 | 1.36 | 112 | 0.23 |
| 4 | 0.7 | 1.5 | 2 | 6,000 | 1.37 | 114 | 0.21 |
| 5 | 0.7 | 1.6 | 2 | 2,900 | 1.37 | 116 | 0.22 |

In the above table, and those following, column A gives the mols of aldehyde per mol of phenol in the aldehyde-deficient resin employed, these examples being of formaldehyde-deficient phenolic resin used as one of the three starting constituents. Column A therefore gives quantitatively the mols of methylene (—CH$_2$—) groups per mol of phenol and shows the deficiency in aldehyde of the starting phenolic resin. Column B gives the total of methylene groups in the end product of which some are derived from the aldehyde-deficent starting resin and the rest from the acetal which as above noted decomposes in the reaction to furnish aldehyde. Column C gives the mols of anhydride per mol of acetal, specifically of maleic anhydride per mol of pentaerythritol. Water absorption was determined by weighing the end-product before and after soaking in water for twenty-four hours.

Table II
[All cured for 16 hours at 95° C. followed by 16 hours at 130° C.]

|   | A | B | C | Modulus of Rupture | Specific Gravity | Rockwell-M (Hardness) | Water Absorption |
|---|---|---|---|---|---|---|---|
|   |   |   |   |   |   |   | Per cent |
| 6 | 0.7 | 1.2 | 2 | 19,300 | 1.33 | 108 | 0.21 |
| 7 | 0.7 | 1.3 | 2 | 24,500 | 1.35 | 118 | 0.23 |
| 8 | 0.7 | 1.4 | 2 | 16,200 | 1.36 | 119 | 0.23 |
| 9 | 0.7 | 1.5 | 2 | 9,900 | 1.37 | 120 | 0.21 |
| 10 | 0.7 | 1.6 | 2 | 8,300 | 1.37 | 121 | 0.22 |

The series of specimens 1 to 5 of Table I and the series 6 to 10 of Table II show that for a fixed aldehyde deficiency in the starting resin (column A), strength (modulus of rupture) decreases as the ratio of methylene groups (total) in the end product to phenol (column B) increases. Lower ratios give the best strength. The strengths of these and the following tables are strengths at room temperature; at temperatures on the order of 150° C., the strengths of the cured resins are the reverse of those at room temperature, that is, the higher ratios (column B) give the greater strengths. Thus I am enabled also to control or predetermine strengths according to the temperature at which the cured resin is to function.

Table III
[All cured for 16 hours at 95° C. followed by 16 hours at 130° C.]

|   | A | B | E | Modulus of Rupture | Specific Gravity | Rockwell-M (Hardness) | Water Absorption |
|---|---|---|---|---|---|---|---|
|   |   |   |   |   |   |   | Per cent |
| 11 | 0.7 | 1.5 | 1.00 | 8,150 | 1.34 | 109 | 0.22 |
| 12 | 0.7 | 1.5 | 1.25 | 10,320 | 1.35 | 112 | 0.19 |
| 13 | 0.7 | 1.5 | 1.50 | 13,760 | 1.36 | 113 | 0.22 |
| 14 | 0.7 | 1.5 | 1.75 | 10,500 | 1.37 | 112 | 0.27 |

Table IV
[All cured for 16 hours at 95° C. followed by 16 hours at 130° C.]

|   | A | B | E | Modulus of Rupture | Specific Gravity | Rockwell-M (Hardness) | Water Absorption |
|---|---|---|---|---|---|---|---|
|   |   |   |   |   |   |   | Per cent |
| 15 | 0.7 | 1.5 | 1.00 | 20,275 | 1.34 | 119 | 0.22 |
| 16 | 0.7 | 1.5 | 1.25 | 18,250 | 1.35 | 121 | 0.19 |
| 17 | 0.7 | 1.5 | 1.50 | 13,690 | 1.36 | 120 | 0.22 |
| 18 | 0.7 | 1.5 | 1.75 | 11,645 | 1.37 | 120 | 0.27 |

In Tables III and IV, column E gives the mols of anhydride per mol of acetal (specifically, maleic anhydride and pentaerythritol) and the two tables, III and IV, show the effect of increasing the ratio between the two. In general, increase in the concentration of the anhydride (maleic, in these examples) decreases the strength of the end product, and thus controls of strength may in this manner also be effected.

In general, the factor of hardness, shown by Tables I, II, III and IV to be slightly variable under control, and the factors of water absorption and of specific gravity are of the same order of magnitude as those of the resins achieved by using a phenol as one of the starting ingredients.

Where an aldehyde-deficient phenolic resin is one of the starting constituents, the potentially reactive liquid form of the mixture can be converted to potentially reactive solid form such as powder form for molding as distinguished from casting, following in general the procedure above described, or conversion to potentially reactive solid form of the potentially reactive liquid form of the resin that contains phenol as one of the starting constituents, all as earlier above described, and in generally like manner the conversion is applicable both when the potentially reactive liquid resin is compounded for thermosetting and when it is compounded to be thermoplastic.

Moreover, I may employ as one of the three starting ingredients any suitable or desirable admixture of a phenol or phenols, taken from the class of phenols with one or more aldehyde-deficient phenolic resins, the latter and the former reacting with the aldehyde component furnished by the acetal, the polyhydric alcohol component of which reacts with the polybasic polycarboxylic acid anhydride; a wide range of controls of the rate of the respective reactions that form the phenol-aldehyde resin and the alkyd resin are here also available, as will now be clearly understood, following in part at least from the rate at which the acetal breaks up or generates, with or without the action of a catalyst, to furnish its respective reactable components. By use of mixtures of phenols and aldehyde-deficient phenolic resins I am also enabled to achieve wider variability or selectability of physical properties of the end product.

Wherever I employ as one of the starting ingredients a phenol according to the invention disclosed in my above-mentioned copending application, or an aldehyde-deficient phenolic resin or condensation product, I am enabled to achieve, within a wide range, nicety of control of the simultaneous reactions that provide respectively the phenol-aldehyde resin and the alkyd resin in the end product, and in this connection it will now be understood that one of the control factors is the rate at which the aldehyde component is supplied to the phenol for reaction therewith, in the one case, and is supplied for reaction with the aldehyde-deficient phenolic resin in the other case. Both the phenols and the aldehyde-deficient phenolic resin or reaction product will be seen to be phenol-containing and aldehyde-reactive to form a phenol-aldehyde resin; in the aldehyde-deficient phenolic resins the molecular ratio of aldehyde to phenol is less than 1, and in the phenols the ratio is zero. Generally the reactions in the two cases have certain characteristics of similarity, as may be said also of the respective end products, yet there are marked differences in properties of the end products according to such factors as the selection of a phenol from the class of phenols as a starting ingredient, there are marked differences in properties of the end products according to such factors as the selection of the phenolic resin from the class of aldehyde-deficient phenolic resins or condensation products as one of the starting ingredients, and a number of important differences, advantages, and superiorities in physical properties are achieved in the second-mentioned end products over the first-mentioned end products. As an illustration, the important matter of reduction of water of formation, already mentioned comparatively above, may be noted at this point, as well as, by way of further example, the achievement of lower viscosity with resultant better adaptation for certain casting operations or for certain other uses such as impregnation. And as above indicated, I may employ more than one polybasic acid anhydride in admixture as another starting ingredient.

It will thus be seen that there has been provided in this invention a method and product in which the various objects hereinbefore set forth, together with many thoroughly practical advantages, are successfully achieved. As many possible embodiments may be made of the mechanical features of the above invention and as the art herein described might be varied in various parts, all without departing from the scope of the invention, it is to be understood that all matter hereinabove set forth is to be interpreted as illustrative and not in a limiting sense.

Since I have taught the use of phenol per se, that is pure phenol without any linkages, and also phenol formaldehyde having a deficiency of formaldehyde, and since the generic expression for these and mixtures thereof is just the one word "phenol," this word when it is not qualified is, in the following claims to be given such generic meaning.

I claim:
1. A casting and moldable mixture for forming a phenol-alkyd resin upon heating said mixture, comprising a phenol containing at least two unsubstituted positions in the benzene ring that are ortho or para to a hydroxyl group, pentaerythritol diformal, and a dicarboxylic acid anhydride in such proportions as to produce on heating a mixture of a thermo-set phenol formaldehyde resin and a thermo-set alkyd resin, said thermo-set mixture being without excess of formaldehyde and having a modulus of rupture greater than 10,800.
2. A mixture according to claim 1 containing an acid catalyst.
3. The thermo-set reaction product produced by heating the mixture of claim 1.
4. A casting and moldable mixture according to claim 1 wherein the dicarboxylic acid anhydride is maleic anhydride.
5. A mixture according to claim 4 containing an acid catalyst.
6. The thermo-set reaction product produced by heating the mixture of claim 4.
7. A mixture according to claim 1 wherein the phenol is phenol.
8. A mixture according to claim 7 containing an acid catalyst.
9. The thermo-set reaction product produced by heating the mixture of claim 7.
10. The mixture in accordance with claim 7 wherein the anhydride is maleic anhydride.
11. A mixture according to claim 10 including an acid catalyst.
12. The thermo-set reaction product produced by heating the mixture of claim 10.
13. The mixture according to claim 1 wherein the phenol is a mixture of phenol and cresol.
14. A mixture according to claim 13 including an acid catalyst.
15. The thermo-set reaction product produced by heating the mixture of claim 13.
16. The mixture in accordance with claim 13 wherein the anhydride is maleic anhydride.
17. A mixture according to claim 16 containing an acid catalyst.
18. The thermo-set reaction product produced by heating the mixture of claim 16.

LORING COES, JR.

REFERENCES CITED

The following references are of record in the file of this patent:

UNITED STATES PATENTS

| Number | Name | Date |
| --- | --- | --- |
| 906,219 | Grognot | Dec. 8, 1908 |
| 2,005,499 | Hill | June 18, 1935 |
| 2,202,765 | Guth | May 28, 1940 |

FOREIGN PATENTS

| Number | Country | Date |
| --- | --- | --- |
| 368,966 | Great Britain | Mar. 17, 1932 |